United States Patent
Ohashi

(10) Patent No.: US 11,350,013 B2
(45) Date of Patent: May 31, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yuji Ohashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/889,943

(22) Filed: Jun. 2, 2020

(65) Prior Publication Data

US 2021/0203809 A1  Jul. 1, 2021

(30) Foreign Application Priority Data

Dec. 27, 2019  (JP) ............................. JP2019-237801

(51) Int. Cl.
  *H04N 1/44* (2006.01)
(52) U.S. Cl.
  CPC ......... *H04N 1/4433* (2013.01); *H04N 1/4413* (2013.01)
(58) Field of Classification Search
  USPC ....... 358/1.1–3.29, 1.11–1.18; 713/100–194, 713/375; 719/311–322, 310; 726/1–35
  See application file for complete search history.

(56) References Cited

U.S. PATENT DOCUMENTS

| | | | |
|---|---|---|---|
| 9,319,562 B2* | 4/2016 | Fujii | H04N 1/4406 |
| 9,596,382 B2* | 3/2017 | Maeda | H04N 1/00506 |
| 10,298,790 B2* | 5/2019 | Maeda | H04N 1/4433 |
| 10,379,798 B2* | 8/2019 | Takenaka | G06F 3/1258 |
| 2007/0139365 A1* | 6/2007 | Li | G06F 9/44505 345/156 |
| 2013/0091540 A1* | 4/2013 | Chen | H04L 63/08 726/1 |
| 2014/0300920 A1* | 10/2014 | Hayashi | G06F 3/1204 358/1.14 |
| 2015/0095982 A1* | 4/2015 | Mizuno | H04L 63/08 726/3 |
| 2015/0381834 A1* | 12/2015 | Mizuno | G06F 3/0484 715/745 |
| 2018/0375891 A1* | 12/2018 | Juncker | H04L 63/14 |
| 2020/0159949 A1* | 5/2020 | Burgess | G06F 21/84 |
| 2020/0267283 A1* | 8/2020 | Tong | G06F 3/1238 |

FOREIGN PATENT DOCUMENTS

JP  2015-153111 A  8/2015

* cited by examiner

*Primary Examiner* — Marcellus J Augustin

(74) *Attorney, Agent, or Firm* — Oliff PLC

(57) ABSTRACT

An information processing apparatus includes a processor configured to obtain personal settings of an authenticated user, identify, among the obtained personal settings on a basis of reliability information including information regarding a reliable apparatus, savable personal settings, which are to be saved to an apparatus that has requested authentication of the user, generate, on a basis of a result of identification, determination information indicating the savable personal settings, which are to be saved to the apparatus that has requested the authentication of the user, and cause a first apparatus to save the savable personal settings obtained on a basis of the determination information.

16 Claims, 14 Drawing Sheets

FIG. 14
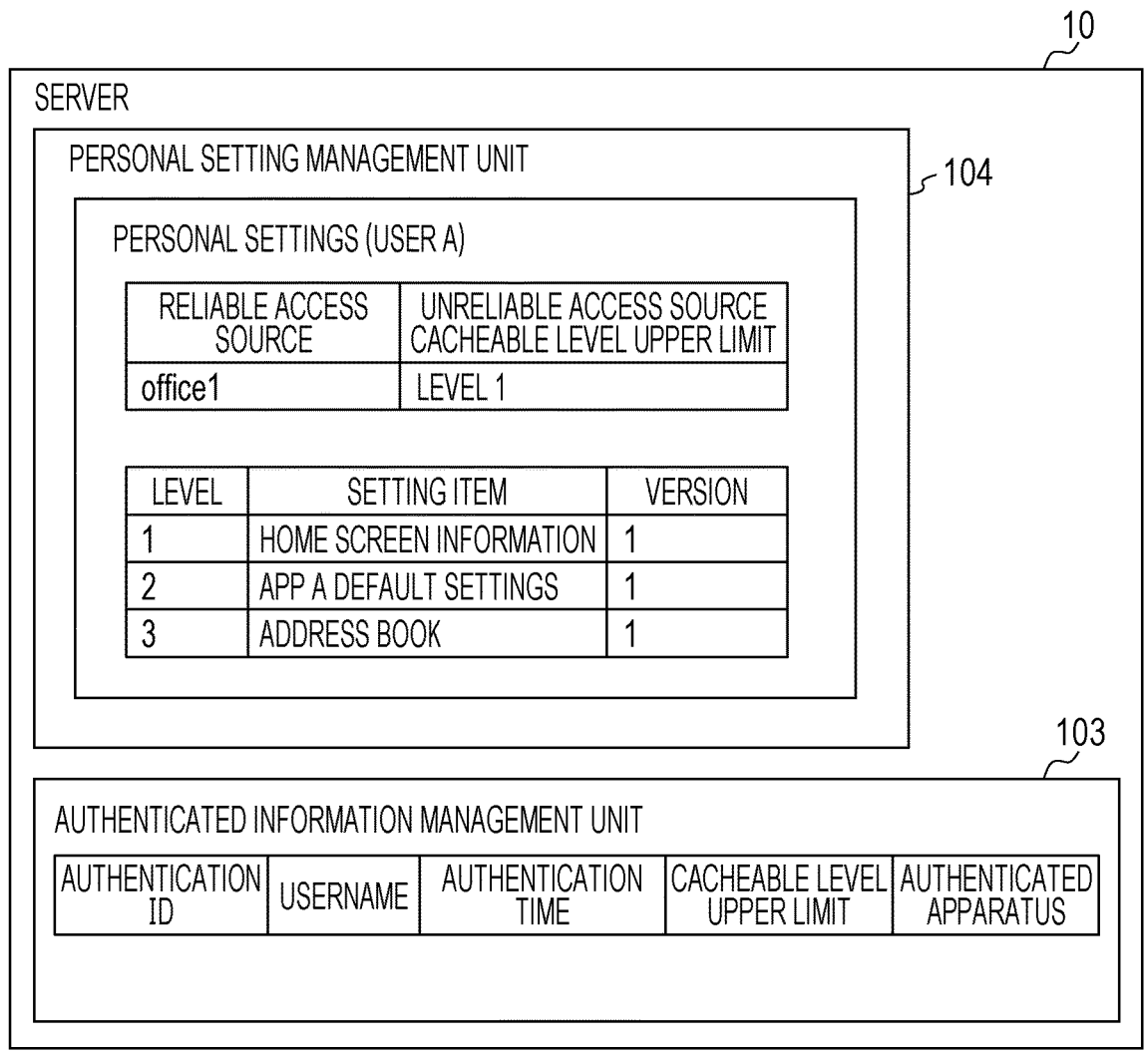
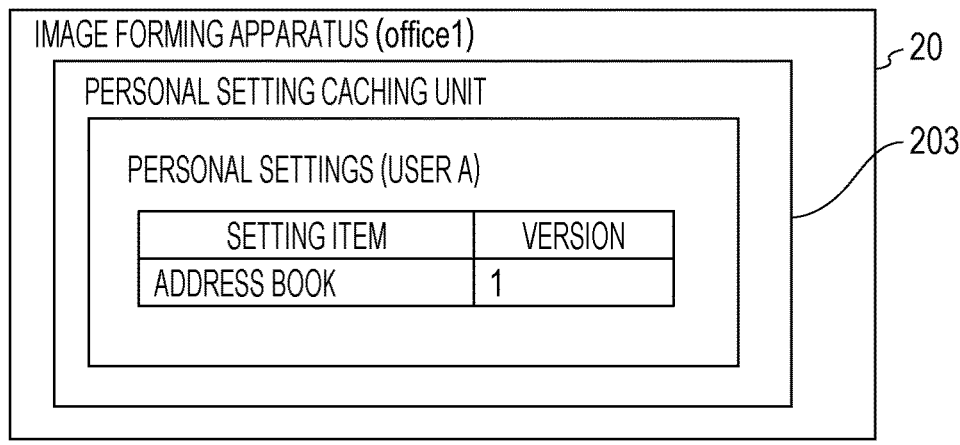

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-237801 filed Dec. 27, 2019.

BACKGROUND

(i) Technical Field

The present disclosure relates to an information processing apparatus and a non-transitory computer readable medium.

(ii) Related Art

Japanese Unexamined Patent Application Publication No. 2015-153111 discloses an image forming apparatus provided with a platform on which an application for accessing personal setting information can be installed. The image forming apparatus includes first saving means for saving first personal setting information, second saving means for saving second personal setting information, and synchronizing means for synchronizing the first personal setting information and personal setting information held by an external apparatus with each other.

SUMMARY

When personal settings of a user, such as settings of an application or address book information, are saved to a server and an apparatus such as an image forming apparatus is used, the personal settings might be downloaded from the server and used. If the apparatus caches the personal settings in this case, convenience improves compared to when the apparatus does not cache the personal settings, because the apparatus need not download the personal settings again when the user for uses the apparatus again.

Convenience improves as described above if an apparatus installed in a place where only certain users use the apparatus, such as an office, caches personal settings. If an apparatus installed in a place where unspecified persons can use the apparatus, such as a convenience store, caches personal settings, on the other hand, some security concerns such as leakage of information due to a cyberattack on the apparatus are caused.

Aspects of non-limiting embodiments of the present disclosure relate to an information processing apparatus and a non-transitory computer readable medium capable of improving safety in protection of personal settings in a configuration in which the personal settings are downloaded onto an apparatus from the outside and cached in the apparatus, compared to when the downloaded personal settings are invariably cached regardless of a type of apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to obtain personal settings of an authenticated user, identify, among the obtained personal settings on a basis of reliability information including information regarding a reliable apparatus, savable personal settings, which are to be saved to an apparatus that has requested authentication of the user, generate, on a basis of a result of identification, determination information indicating the savable personal settings, which are to be saved to the apparatus that has requested the authentication of the user, and cause a first apparatus to save the savable personal settings obtained on a basis of the determination information.

BRIEF DESCRIPTION OF THE DRAWINGS

An exemplary embodiment of the present disclosure will be described in detail based on the following figures, wherein:

FIG. 14 is a diagram illustrating the process for caching personal settings of a user performed by the image forming apparatus;

DETAILED DESCRIPTION

Figure 1:
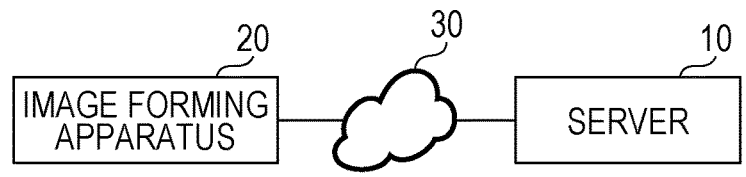
FIG. 1 is a diagram illustrating a schematic configuration of an information processing system according to an exemplary embodiment.

An exemplary embodiment of the present disclosure will be described hereinafter with reference to the drawings. In the drawings, the same or equivalent components or parts are given the same reference numerals. Dimensions and ratios in the drawings are exaggerated for convenience of description and might be different from actual dimensions and ratios.

FIG. 1 is a diagram illustrating a schematic configuration of an information processing system according to the present exemplary embodiment. In the information processing system according to the present exemplary embodiment, a server 10, which is an example of an information processing apparatus in the present disclosure, and an image forming apparatus 20 are connected to each other over a network 30. The network 30 is, for example, the Internet, an intranet, or the like. The server 10 and the image forming apparatus 20 may be connected to each other by wire or wirelessly. Although FIG. 1 illustrates only one image forming apparatus 20, image forming apparatuses 20 can be installed at various places.

The server 10 saves, for each user who uses the image forming apparatus 20, personal settings to be used by the image forming apparatus 20. The personal settings to be used by the image forming apparatus 20 include, for example, settings of a home screen displayed on a panel of the image forming apparatus 20, settings of applications to be executed on the image forming apparatus 20, and address book information used to transmit mails or facsimile data from the image forming apparatus 20. The personal settings to be used by the image forming apparatus 20 can also include, for example, token information used to sign on another system. That is, some of the personal settings to be used by the image forming apparatus 20 need to be strictly managed while the other personal settings need not be strictly managed.

The image forming apparatus 20 forms images on a recording medium such as sheets of paper on the basis of print jobs and may be any kind of apparatus, such as a printer or a multifunction peripheral (MFP).

As our working styles diversify, more and more people are now working not only at offices but also at home or coworking spaces. It is desirable for such a person to be able to use the same settings, the same user interfaces, and the same information regardless of an image forming apparatus 20 used. Image forming apparatuses 20 are capable of obtaining, from the server 10, personal settings saved by an authenticated user to the server 10 and performing various processes using the obtained personal settings. The user of the image forming apparatus 20, therefore, can use the same settings, the same user interfaces, and the same information regardless of the image forming apparatus 20 used.

When personal settings of a user, such as settings of an application or address book information, are saved to the server 10 and the image forming apparatus is used, the image forming apparatus 20 downloads the personal settings from the server 10. If the image forming apparatus 20 caches the personal settings, the image forming apparatus 20 need not download the personal settings again when the user uses the image forming apparatus 20 again. The user's convenience during use of the image forming apparatus 20, therefore, improves compared to when the image forming apparatus 20 does not cache the personal settings.

When the image forming apparatus 20 is installed in a place where only certain users use the image forming apparatus 20, such as an office, the user's convenience improves by causing the image forming apparatus 20 to cache the personal settings. When the image forming apparatus 20 is installed in a place where unspecified persons use the image forming apparatus 20, such as a convenience store, on the other hand, some security concerns such as leakage of information due to a cyberattack on the image forming apparatus 20 are caused if the image forming apparatus 20 caches the personal settings.

The server 10 according to the present exemplary embodiment saves, for each user who uses an image forming apparatus 20, information regarding an image forming apparatus 20 reliable as an access source. When the image forming apparatus 20 uses personal settings of a user, the server 10 generates determination information indicating whether the personal settings can be cached.

The image forming apparatus 20 determines, on the basis of the determination information generated by the server 10, personal settings to be cached when the user logs out of the image forming apparatus 20. The image forming apparatus 20 then caches cacheable personal settings and discards non-cacheable personal settings.

Figure 2:
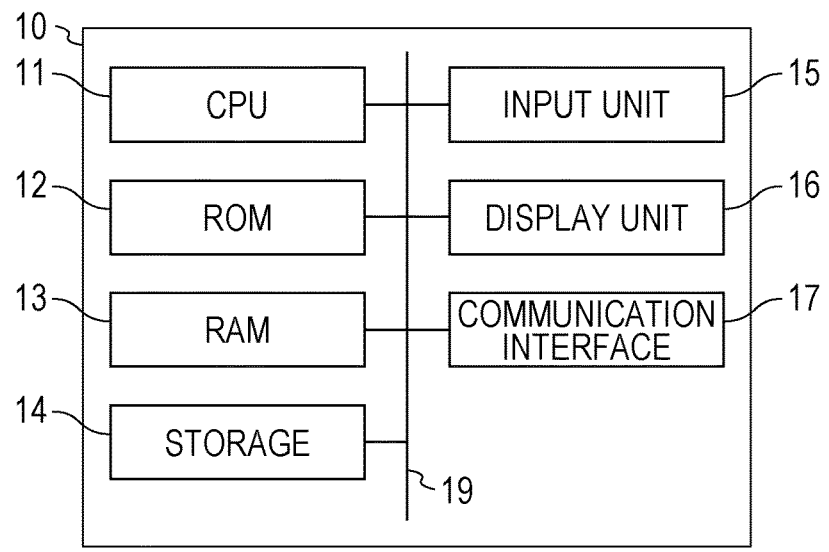
FIG. 2 is a block diagram illustrating the hardware configuration of a server.

FIG. 2 is a block diagram illustrating the hardware configuration of the server 10.

As illustrated in FIG. 2, the server 10 includes a central processing unit (CPU) 11, a read-only memory (ROM) 12, a random-access memory (RAM) 13, a storage 14, an input unit 15, a display unit 16, and a communication interface 17. The components are communicably connected to one another through a bus 19.

The CPU 11 executes various programs and controls the other components. That is, the CPU 11 reads a program from the ROM 12 or the storage 14 and executes the program using the RAM 13 as a working area. The CPU 11 controls the other components and performs various types of processing in accordance with the programs stored in the ROM 12 or the storage 14. In the present exemplary embodiment, a determination program for determining which personal settings can be cached by the image forming apparatus 20 is stored in the ROM 12 or the storage 14.

The ROM 12 stores various programs and various pieces of data. The RAM 13 temporarily stores a program or data as a working area. The storage 14 is achieved by a storage device such as a hard disc drive (HDD), a solid-state drive (SSD), or a flash memory and stores various programs including an operating system (OS) and various pieces of data.

The input unit 15 includes a pointing device such as a mouse and a keyboard and is used to make various inputs.

The display unit 16 is a liquid crystal display, for example, and displays various pieces of information. The display unit 16 may employ a touch panel system and also serve as the input unit 15.

The communication interface 17 is used to communicate with other apparatuses such as the image forming apparatus 20. A standard such as Ethernet, fiber distributed data interface (FDDI), or Wi-Fi (registered trademark) is used.

Figure 3:
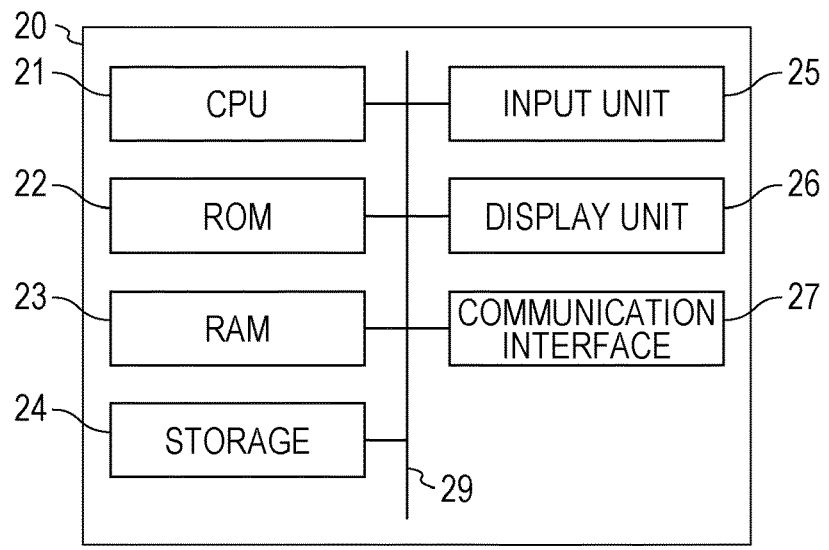
FIG. 3 is a block diagram illustrating the hardware configuration of an image forming apparatus.

FIG. 3 is a block diagram illustrating the hardware configuration of the image forming apparatus 20.

As illustrated in FIG. 3, the image forming apparatus 20 includes a CPU 21, a ROM 22, a RAM 23, a storage 24, an input unit 25, a display unit 26, and a communication interface 27. The components are communicably connected to one another through a bus 29.

The CPU 21 executes various programs and controls the other components. That is, the CPU 21 reads a program from the ROM 22 or the storage 24 and executes the program using the RAM 23 as a working area. The CPU 21 controls the other components and performs various types of processing in accordance with the programs stored in the ROM 22 or the storage 24. In the present exemplary embodiment, a determination program for determining which personal settings can be cached by the image forming apparatus 20 is stored in the ROM 22 or the storage 24.

The ROM 22 stores various programs and various pieces of data. The RAM 23 temporarily stores a program or data as a working area. The storage 24 is achieved by a storage device such as an HDD, an SSD, or a flash memory and stores various programs including an OS and various pieces of data.

The input unit 25 includes hard keys and is used to make various inputs.

The display unit 26 is a liquid crystal display, for example, and displays various pieces of information. The display unit 26 may employ a touch panel system and also serves as the input unit 25.

The communication interface 27 is used to communicate with other apparatuses such as the server 10. A standard such as Ethernet, FDDI, or Wi-Fi (registered trademark) is used.

When executing the determination program, the server 10 and the image forming apparatus 20 achieve various functions using the above hardware resources. The functional configuration of the server 10 and the image forming apparatus 20 will be described hereinafter.

Figure 4:
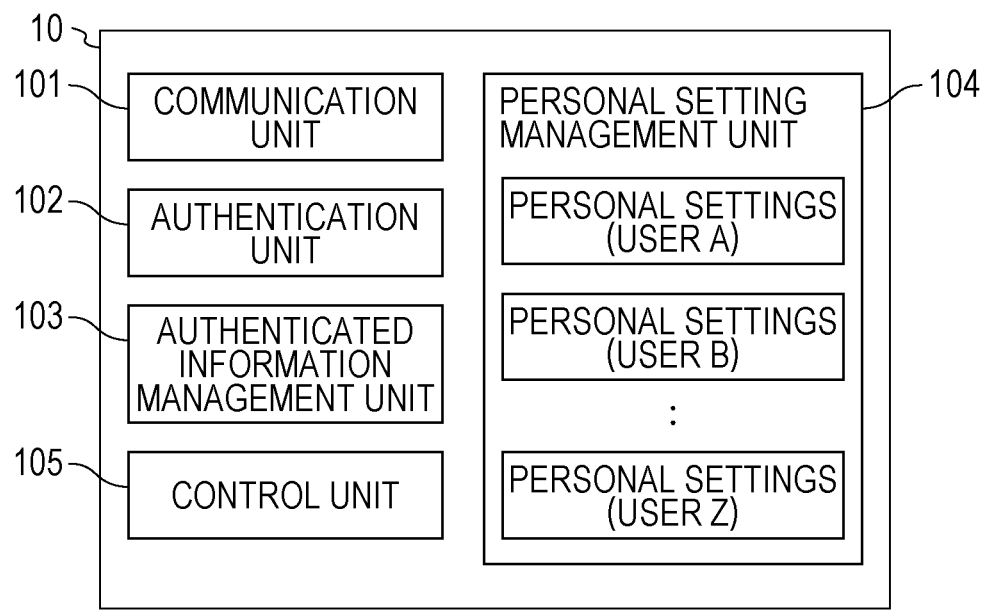
FIG. 4 is a block diagram illustrating an example of the functional configuration of the server.

FIG. 4 is a block diagram illustrating an example of the functional configuration of the server 10.

As illustrated in FIG. 4, the server 10 includes a communication unit 101, an authentication unit 102, an authenticated information management unit 103, a personal setting management unit 104, and a control unit 105 as functional components. The functional components are achieved by reading a program stored in the ROM 12 or the storage 14 and executing the program using the CPU 11.

The communication unit 101 communicates with other apparatuses such as the image forming apparatus 20.

The control unit 105 controls the operation of the other components of the server 10. When the image forming apparatus 20 uses personal settings of a user, for example, the control unit 105 generates determination information indicating whether the personal settings can be cached. The control unit 105 causes the communication unit 101 to transmit the generated determination information to the image forming apparatus 20.

The server 10 authenticates a user who uses the image forming apparatus 20. If authenticating the user, the authentication unit 102 obtains personal settings of the user from the personal setting management unit 104. In addition, if authenticating the user, the authentication unit 102 registers information regarding the authenticated user to the authenticated information management unit 103.

The authenticated information management unit 103 manages information regarding a user authenticated by the authentication unit 102. The information regarding an authenticated user is registered to an authentication list. Information managed by the authenticated information management unit 103 will be described later.

The personal setting management unit 104 manages, for each user who uses the image forming apparatus 20, personal settings of the user. FIG. 4 illustrates an example in which the personal setting management unit 104 manages personal settings of users A to Z. The personal settings managed by the personal setting management unit 104 are downloaded by an image forming apparatus 20 used by a user authenticated by the authentication unit 102.

The personal setting management unit 104 manages each set of personal settings while specifying a level. In the present exemplary embodiment, higher levels indicate personal settings to be managed more strictly. For example, three levels of 1 to 3 are provided, and level 1 is given to information regarding a home screen, level 2 is given to default settings of applications used on the image forming apparatus 20, and level 3 is given to address book information or token information used for single sign-on. By managing each set of personal settings while specifying a level using the personal setting management unit 104, the server 10 can allow a reliable image forming apparatus 20 to cache personal settings of high levels. In addition, by managing each set of personal setting while specifying a level using the personal setting management unit 104, the server 10 can generate determination information in such a way as to allow an unreliable image forming apparatus 20 to cache only personal settings of low levels.

A manager of the information processing system may set levels for personal settings in advance, or each user may set levels himself/herself. Each user may change the level of each set of personal settings set in advance by the manager of the information processing system. When a user changes the set levels, the user may be disabled from lowering the levels.

The server 10 may set plural types of address book information and then set a different level for each type of address book information. Different levels may be set between, for example, address book information including only user identifiers (IDs) and address book information including user IDs, names, mail addresses, and departments. A lower level may be set for the former address book information, and a higher level may be set for the latter address book information.

Figure 5:
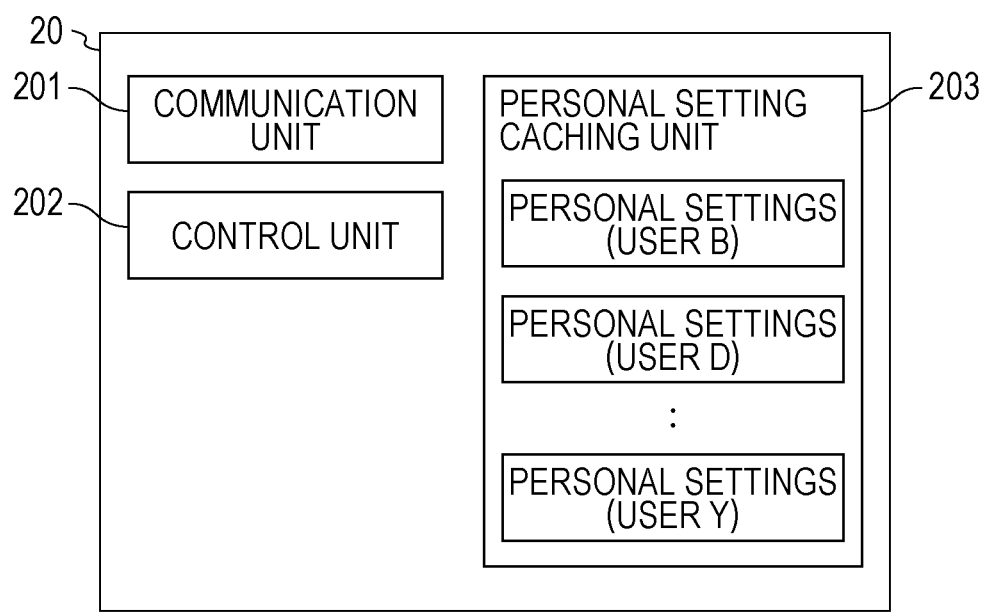
FIG. 5 is a block diagram illustrating an example of the functional configuration of the image forming apparatus.

FIG. 5 is a block diagram illustrating an example of the functional configuration of the image forming apparatus 20.

As illustrated in FIG. 5, the image forming apparatus 20 includes a communication unit 201, a control unit 202, and a personal setting caching unit 203 as functional components. The functional components are achieved by reading a program stored in the ROM 22 or the storage 24 and executing the program using the CPU 21.

The communication unit 201 communicates with other apparatuses such as the server 10.

The control unit 202 controls the other components of the image forming apparatus 20. For example, the control unit 202 requests, through the communication unit 201, the server 10 to authenticate a user who is going to use the image forming apparatus 20. In addition, when the image forming apparatus 20 caches personal settings of a user obtained by the server 10, for example, the control unit 202 caches, in the personal setting caching unit 203, the personal settings of the user on the basis of determination information indicating whether the personal settings can be cached.

The personal setting caching unit 203 caches personal settings of each user who uses the image forming apparatus 20. FIG. 5 illustrates an example in which the personal setting caching unit 203 caches personal settings of the users B to Y.

Next, the operation of the information processing system will be described.

Figure 6:
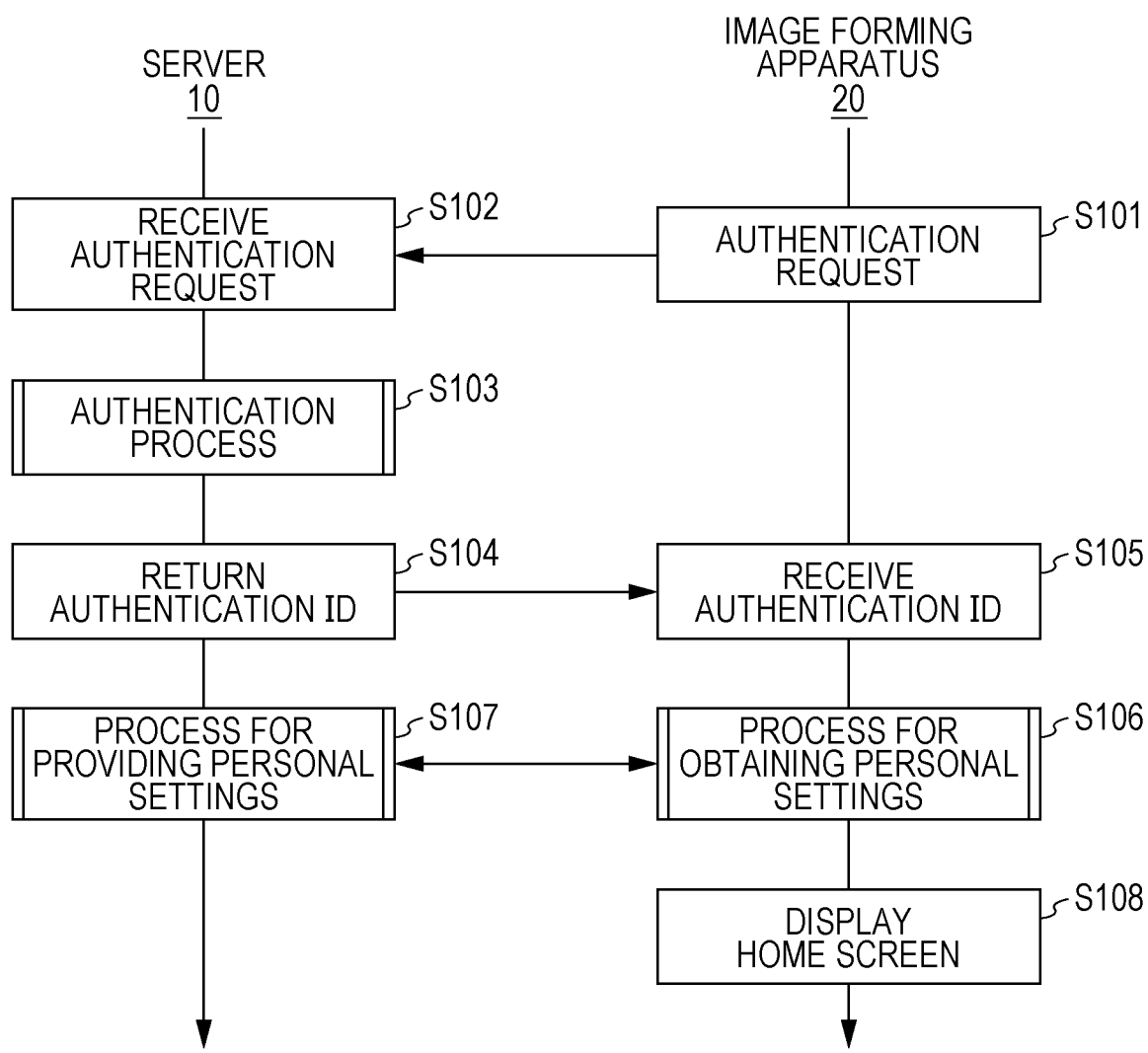
FIG. 6 is a flowchart illustrating an authentication process performed by the information processing system.

FIG. 6 is a flowchart illustrating an authentication process performed by the information processing system. FIG. 6 illustrates the operation of the server 10 and the image forming apparatus 20.

The image forming apparatus 20 requests the server 10 to authenticate a user who is going to use the image forming apparatus 20 (step S101). A method for authenticating a user is not particularly limited. For example, a user may be authenticated using a user ID and a password input by the user to the image forming apparatus 20 or by asking the user to hold an integrated circuit (IC) card onto a card reader of the image forming apparatus 20.

Upon receiving the request to authenticate the user from the image forming apparatus 20 (step S102), the server 10 performs a process for authenticating a user on the basis of information received from the image forming apparatus 20 (step S103). Details of the process for authenticating a user will be described later.

After authenticating the user as a result of the process for authenticating a user, the server 10 returns an authentication ID to the image forming apparatus 20 that has requested the authentication (step S104). The image forming apparatus 20 receives the authentication ID transmitted from the server 10 (step S105).

Next, the image forming apparatus 20 performs a process for obtaining personal settings of the authenticated user from the server 10 (step S106). The server 10 performs a process for providing personal settings for the image forming apparatus 20 (step S107). Upon obtaining the personal settings of the authenticated user from the server 10, the image forming apparatus 20 displays a home screen on the display unit 26 on the basis of the obtained personal settings (step S108).

Next, the process for authenticating a user performed by the server 10 will be described.

Figure 7:
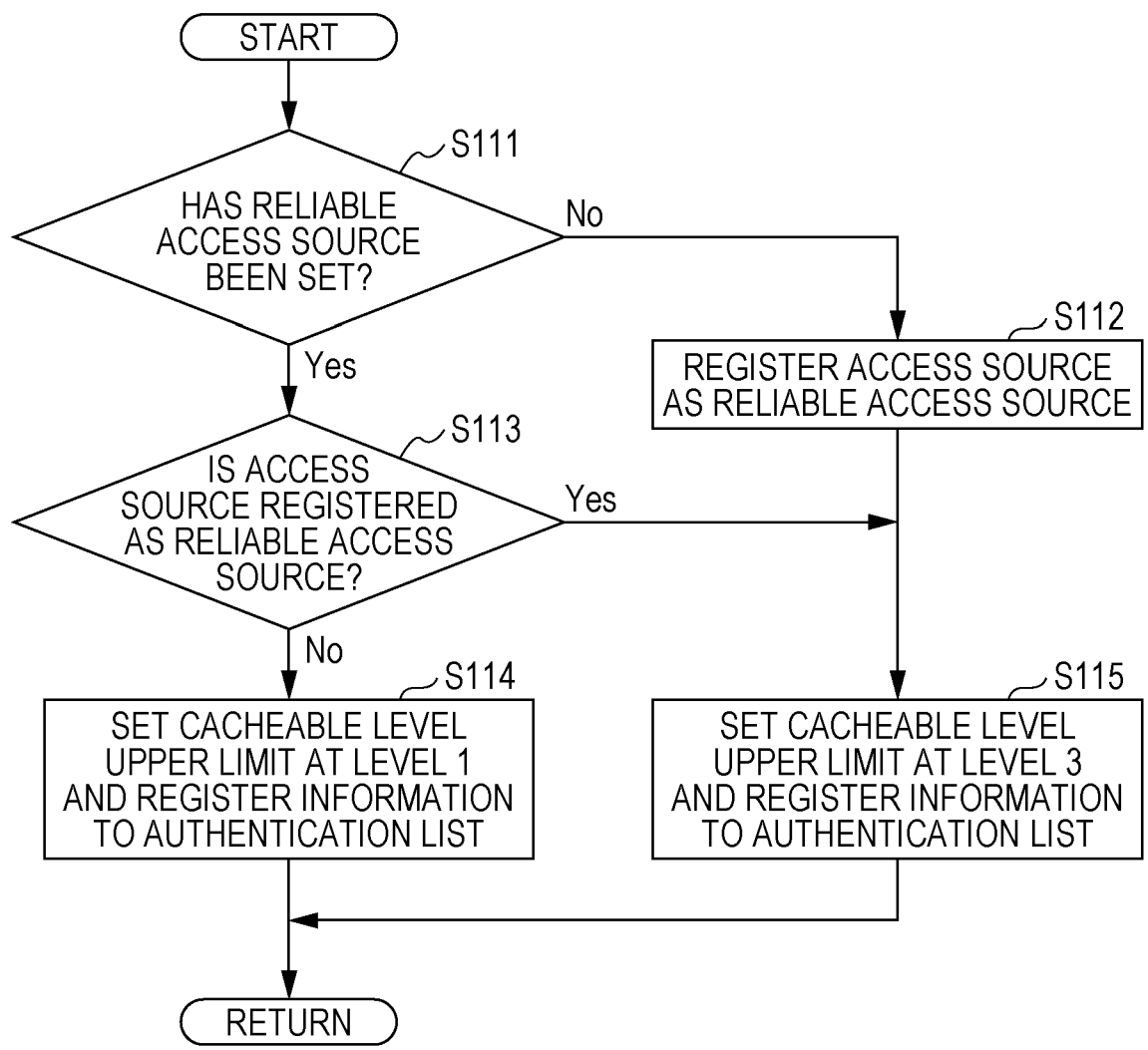
FIG. 7 is a flowchart illustrating a process for authenticating a user performed by the server.

FIG. 7 is a flowchart illustrating the process for authenticating a user performed by the server 10. The process is performed by reading an authentication program from the ROM 12 or the storage 14, loading the authentication program into the RAM 13, and executing the authentication program using the CPU 11. It is assumed that, before the process illustrated in FIG. 7 is performed, a user has been authenticated as a user authorized to use the information processing system as a result of a request to authenticate the user transmitted from the image forming apparatus 20.

After obtaining the request to authenticate a user transmitted from the image forming apparatus 20 and authenticating the user, the CPU 11 determines whether a reliable access source has been set to the server 10 (step S111). Information regarding a reliable access source is set as one of personal settings of the user managed by the personal setting management unit 104.

If determining in step S111 that no reliable access source is set to the server 10 (NO in step S111), the CPU 11 registers, to the personal setting management unit 104 as a reliable access source, the image forming apparatus 20 (access source) that has transmitted the request to authenticate the user (step S112). That is, if the information processing system is being used by a user for the first time by connecting to the server 10 from the image forming apparatus 20, the CPU 11 registers the access source to the personal setting management unit 104 as a reliable access source. This is because a first access source is regarded as a reliable access source installed in a place where only certain users use the information processing system, such as an office. The CPU 11 may also register access sources belonging to the same network as the first access source, such as the same subnet mask, or access sources within a range of certain Internet protocol (IP) addresses to the personal setting management unit 104 as reliable access sources. When the access sources belonging to the same network as the first access source have been registered to the personal setting management unit 104 as reliable access sources, the server 10 can manage all the access sources as reliable access sources.

It is needless to say that the first access source might be an access source installed in a place where unspecified persons can use the image forming apparatus 20, such as a convenience store. The CPU 11, therefore, may refer to information regarding a place where the image forming apparatus 20 is installed when registering the image forming apparatus 20 to the personal setting management unit 104 as a reliable access source. The information regarding a place where the image forming apparatus 20 is installed may be an IP address, a media access control (MAC) address, or information specifically indicating the place where the image forming apparatus 20 is installed, such as a name of the place "office", "convenience store", or "coworking place".

If there is no information regarding a place where the image forming apparatus 20 is installed, the CPU 11 may determine, in accordance with a method used to input information for authentication, whether to register the first access source to the personal setting management unit 104 as a reliable access source. If the user has input information for authentication to the image forming apparatus 20 by holding an IC card onto the image forming apparatus 20, for example, it can be assumed that the user is located inside an office. If the user has input information for authentication to the image forming apparatus 20 by holding an IC card onto the image forming apparatus 20, therefore, the CPU 11 may register the access source to the personal setting management unit 104 as a reliable access source.

If determining in step S111 that a reliable access source has been set to the server 10 (YES in step S111), on the other hand, the CPU 11 may determine whether the access source is the access source registered in the personal setting management unit 104 as a reliable access source (step S113).

If determining in step S113 that the access source is the access source registered in the personal setting management unit 104 as a reliable access source (YES in step S113), the CPU 11 sets an upper limit of levels at which the image forming apparatus 20 that is the access source can cache personal settings (cacheable level upper limit) at level 3. When the information processing system is being used by a user for the first time by connecting to the server 10 from the image forming apparatus 20, too, the CPU 11 sets the cacheable level upper limit of the image forming apparatus 20 that is the access source at level 3. The CPU 11 then registers information regarding the image forming apparatus 20 that is the access source to the authentication list managed by the authenticated information management unit 103 (step S114).

If determining in step S113 that the access source is not the access source registered in the personal setting management unit 104 as a reliable access source (NO in step S113), on the other hand, the CPU 11 sets the cacheable level upper limit of the image forming apparatus 20 that is the access source at level 1. The CPU 11 then registers the information regarding the image forming apparatus 20 that is the access source to the authentication list managed by the authenticated information management unit 103 (step S115).

Figure 8:
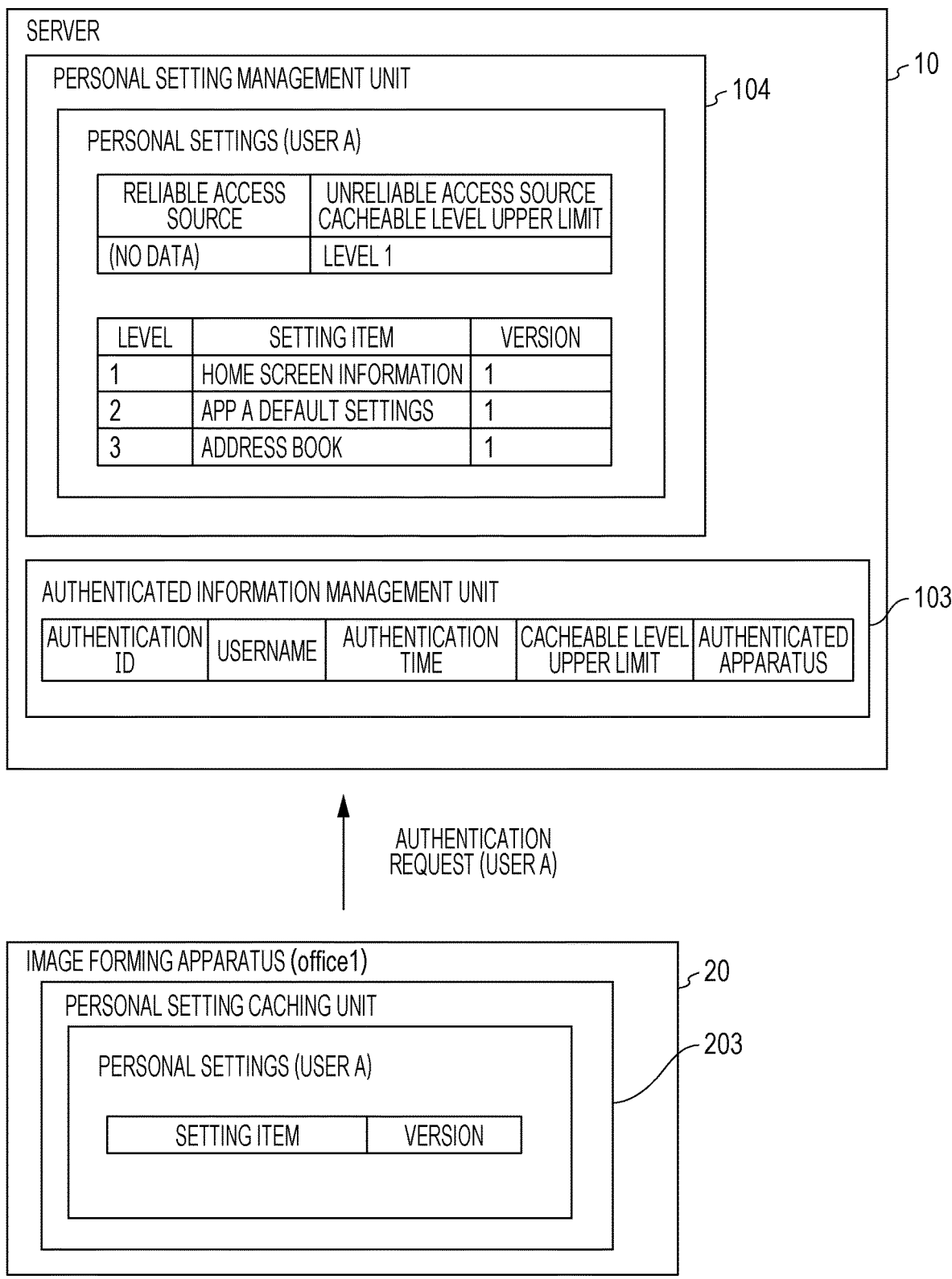
FIG. 8 is a diagram illustrating the process for authenticating a user performed by the server.

FIG. 8 is a diagram illustrating the process for authenticating a user performed by the server 10. FIG. 8 illustrates an example of a case where no reliable access source is registered in personal settings of the user A in the personal setting management unit 104 when the image forming apparatus 20 has transmitted a request to authenticate the user A. It is assumed in FIG. 8 that the image forming apparatus 20 is installed in an office and "office1" is set for the image forming apparatus 20 as an identifier.

Figure 9:
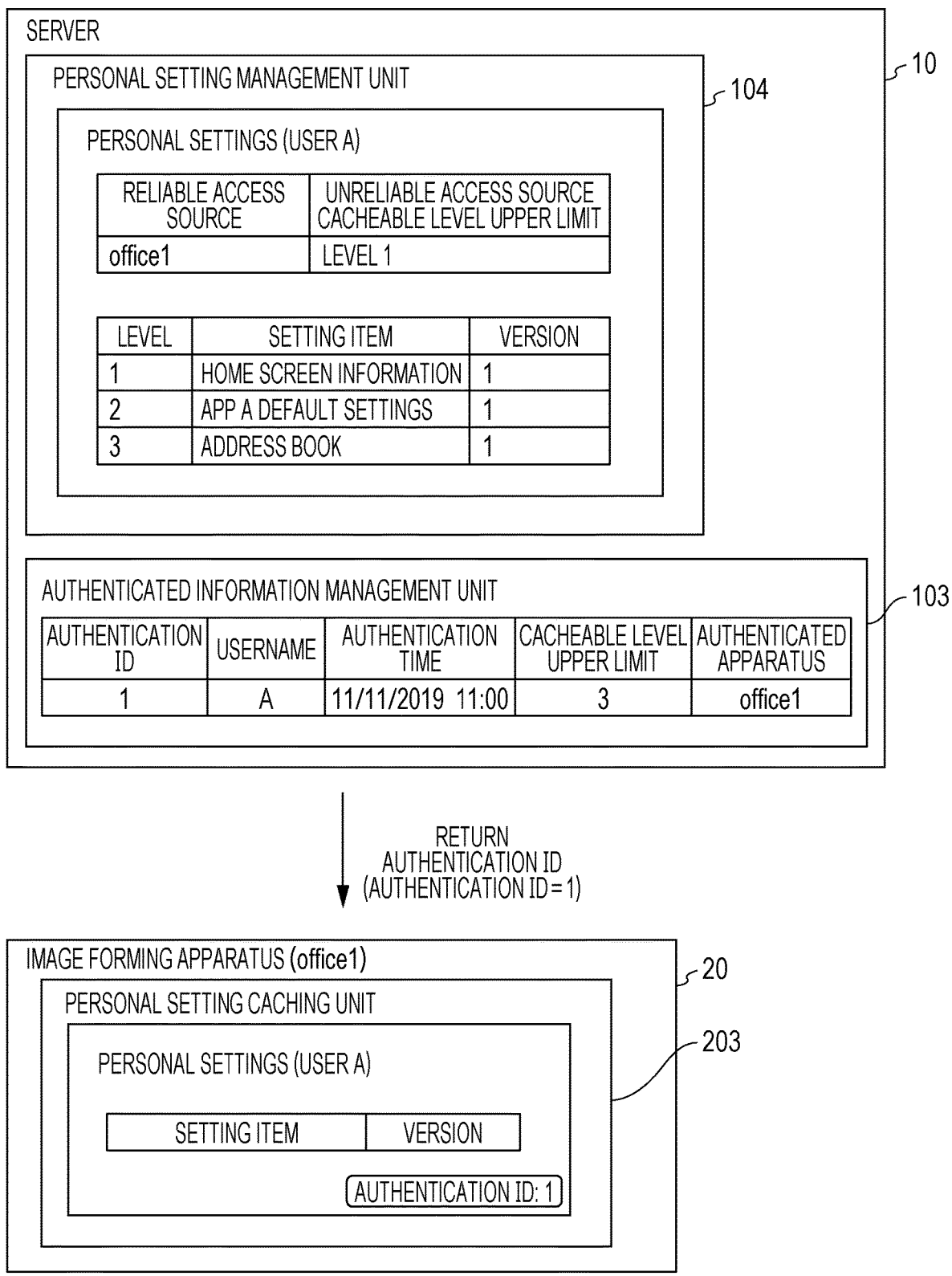
FIG. 9 is another diagram illustrating the process for authenticating a user performed by the server.

FIG. 9 is another diagram illustrating the process for authenticating a user performed by the server 10. FIG. 9 illustrates an example in which the server 10 returns an authentication ID to the image forming apparatus 20. The server 10 registers the identifier "office1" of the image forming apparatus 20 to "reliable access source" in the personal settings of the user A. The server 10 then registers an authentication ID, a username, an authentication time, a cacheable level upper limit, and information regarding the image forming apparatus 20 to the authentication list managed by the authenticated information management unit 103. In FIG. 9, "1" is set as the authentication ID. The server 10 returns "1" to the image forming apparatus 20 as the authentication ID. By registering the information regarding the authenticated user to the authenticated information management unit 103, the server 10 can determine, when the user requests authentication using another image forming apparatus 20, whether to authenticate the user.

Figure 10:
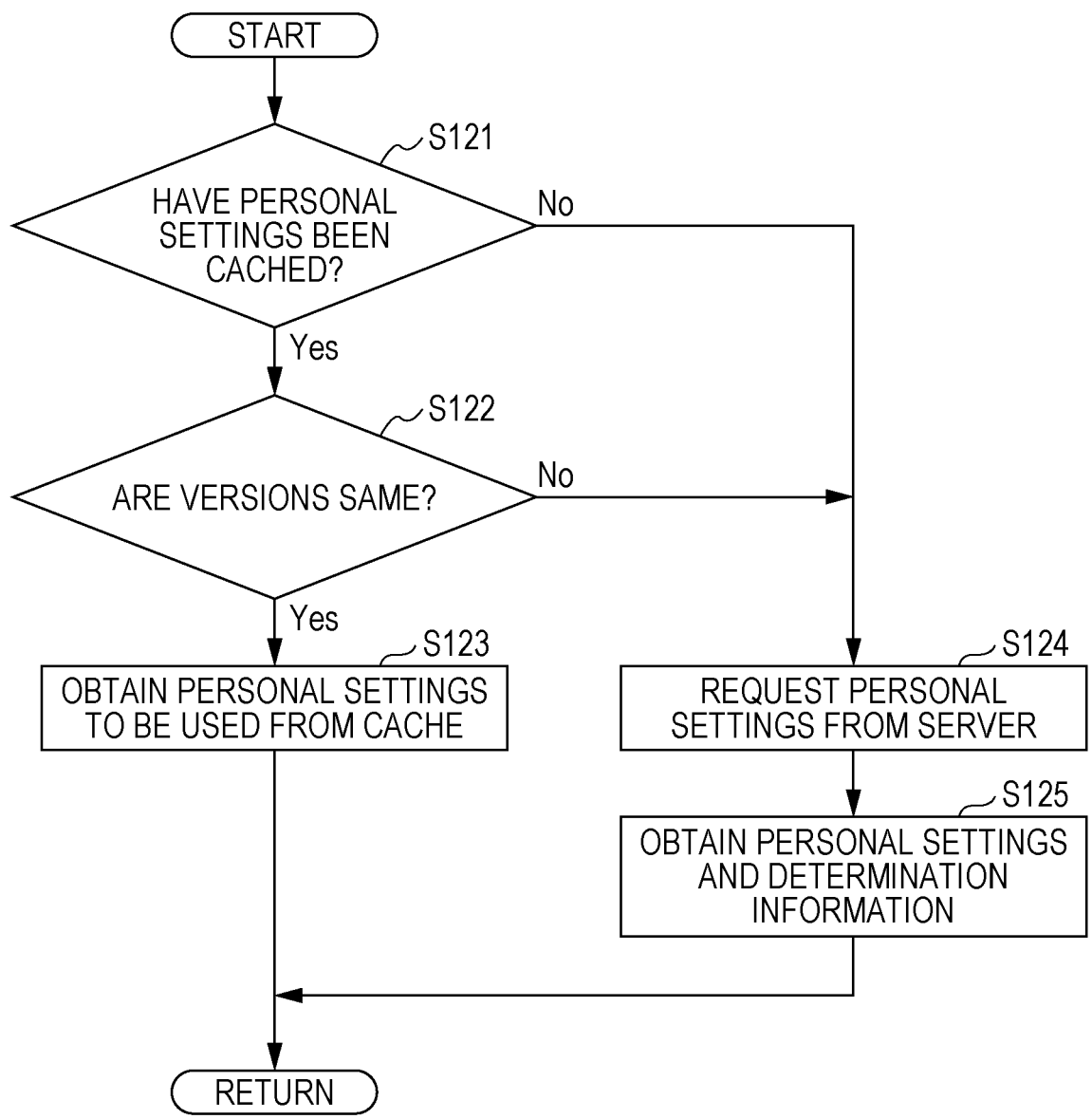
FIG. 10 is a flowchart illustrating a process for obtaining personal settings of a user performed by the image forming apparatus.

FIG. 10 is a flowchart illustrating the process for obtaining personal settings of a user performed by the image forming apparatus 20. The process for obtaining personal settings is performed by reading a program for obtaining personal settings from the ROM 22 or the storage 24, loading the program into the RAM 23, and executing the program using the CPU 21.

The CPU 21 determines whether personal settings to be used by a user have been cached in the personal setting caching unit 203 (step S121).

If determining in step S121 that the personal settings to be used by the user have been cached in the personal setting caching unit 203 (YES in step S121), the CPU 21 determines whether a version of the personal settings cached in the personal setting caching unit 203 and a version of personal settings managed by the server 10 are the same (step S122).

If determining in step S122 that the version of the personal settings cached in the personal setting caching unit 203 and the version of the personal settings managed by the server 10 are the same (YES in step S122), the CPU 21 obtains, from the personal setting caching unit 203, personal settings to be used by the user (step S123).

If determining in step S121 that the personal settings to be used by the user have not been cached in the personal setting caching unit 203 (NO in step S121), the CPU 21 requests the personal settings from the server 10 (step S124).

If determining in step S122 that the version of the personal settings cached in the personal setting caching unit 203 and the version of the personal settings managed by the server 10 are not the same (NO in step S122), the CPU 21 requests the personal settings from the server 10 (step S124). That is, if the version of the personal settings managed by the server 10 is higher than the version of the personal settings cached in the personal setting caching unit 203, the CPU 21 requests the personal settings from the server 10.

After step S124, the CPU 21 obtains determination information indicating whether the obtained personal settings can be cached along with the personal settings from the server 10 (step S125).

By obtaining determination information indicating whether the obtained personal settings can be cached when obtaining the personal settings from the server 10, the CPU 21 can determine, on the basis of the determination information, whether the obtained personal settings can be cached.

Figure 11:
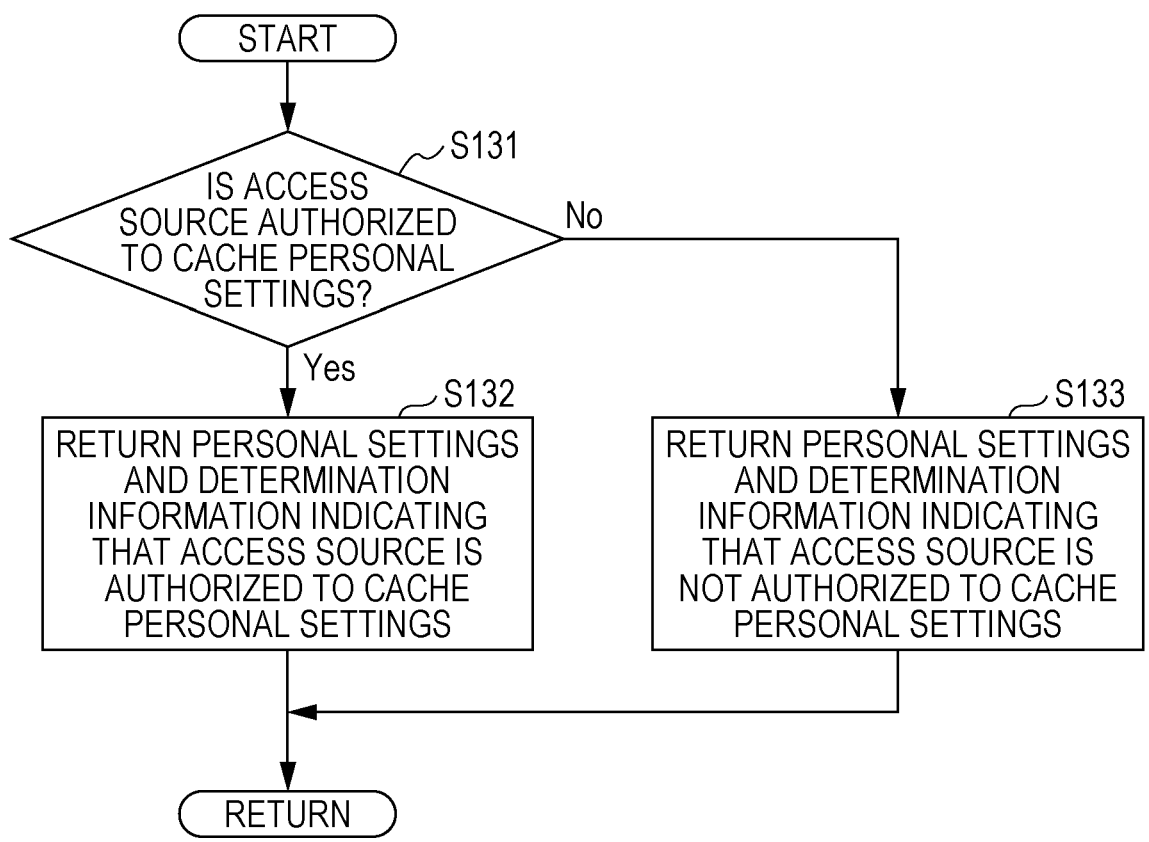
FIG. 11 is a flowchart illustrating a process for providing personal settings of a user performed by the server.

FIG. 11 is a flowchart illustrating the process for providing personal settings of a user performed by the server 10. The process for providing personal settings is performed by reading a program for providing personal settings from the ROM 12 or the storage 14, loading the program into the RAM 13, and executing the program using the CPU 11.

The CPU 11 obtains a request for personal setting from an image forming apparatus 20 that is an access source and determines whether the image forming apparatus 20 that is the access source is authorized to cache the requested personal settings (step S131). The CPU 11 determines whether the image forming apparatus 20 that is the access source is authorized to cache the personal settings by referring to the personal settings of the user.

If determining in step S131 that the image forming apparatus 20 that is the access source is authorized to cache the requested personal settings (YES in step S131), the CPU 11 generates determination information indicating that the image forming apparatus 20 that is the access source is authorized to cache the personal settings and returns the personal settings and the determination information to the image forming apparatus 20 (step S132).

If determining in step S131 that the image forming apparatus 20 that is the access source is not authorized to cache the requested personal settings (NO in step S131), on the other hand, the CPU 11 generates determination information indicating that the image forming apparatus 20 that is the access source is not authorized to cache the personal settings and returns the personal settings and the determination information to the image forming apparatus 20 (step S133).

By generating determination information indicating whether the obtained personal settings can be cached when providing the personal settings for the image forming apparatus 20, the CPU 11 can determine, on the basis of the determination information, whether the image forming apparatus 20 is authorized to cache the personal settings.

Figure 12:
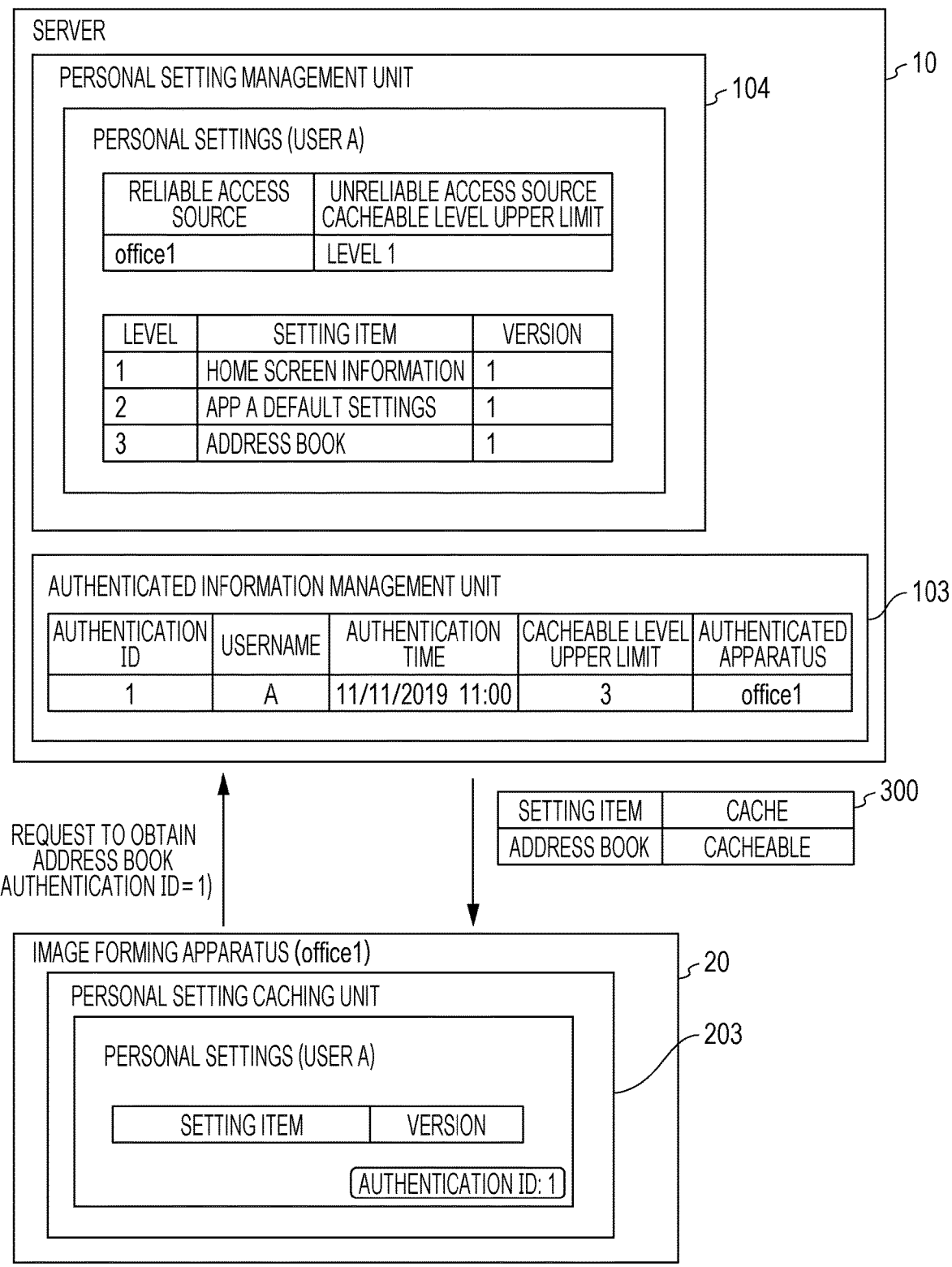
FIG. 12 is a diagram illustrating the process for obtaining personal settings of a user performed by the image forming apparatus and the process for providing personal settings of a user performed by the server.

FIG. 12 is a diagram illustrating the process for obtaining personal settings of a user performed by the image forming apparatus 20 and the process for providing personal settings of a user performed by the server 10.

FIG. 12 illustrates an example of a case where the image forming apparatus 20 that has obtained the authentication ID "1" from the server 10 requests, from the server 10, an address book in the personal settings of the authenticated user A. In this case, a level of the address book is set at 3 in the personal settings of the user A managed by the personal setting management unit 104. In the authenticated information management unit 103, a cacheable level upper limit of a record whose authentication ID is "1" is 3. The CPU 11, therefore, generates determination information 300 indicating that the image forming apparatus 20 that is the access source can cache the address book. The CPU 11 then provides the generated determination information 300 for the image forming apparatus 20 as well as the address book in the personal settings of the user A.

The image forming apparatus 20 determines whether to cache or discard the personal settings obtained from the server 10 when the authenticated user logs out.

Figure 13:
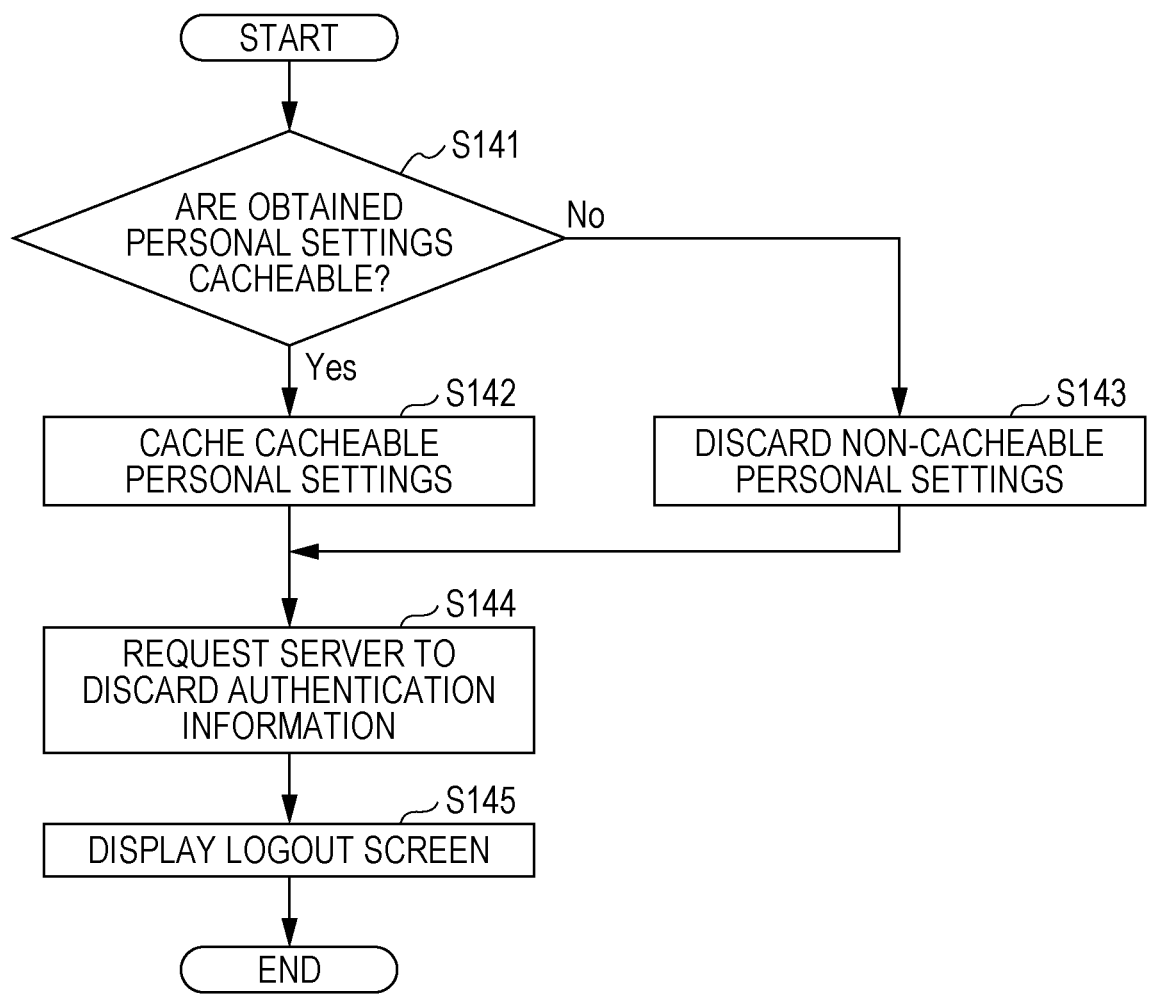
FIG. 13 is a flowchart illustrating a process for caching personal settings of a user performed by the image forming apparatus.

FIG. 13 is a flowchart illustrating a process for caching personal settings of a user performed by the image forming apparatus 20. The process for caching personal setting is performed by reading a program for caching personal settings from the ROM 22 or the storage 24, loading the program into the RAM 23, and executing the program using the CPU 21.

The CPU 21 determines, on the basis of determination information obtained from the server 10, whether personal settings obtained from the server 10 are cacheable (step S141).

If determining in step S141 that the personal settings obtained from the server 10 are cacheable (YES in step S141), the CPU 21 causes the personal setting caching unit 203 to cache the cacheable personal settings (step S142).

If determining in step S142 that the personal settings obtained from the server 10 are not cacheable (NO in step S141), on the other hand, the CPU 21 discards the non-cacheable personal settings without caching the non-cacheable personal settings in the personal setting caching unit 203 (step S143).

After step S142 or S143, the CPU 21 requests the server 10 to discard information for authentication (step S144).

After requesting the server 10 to discard information for authentication, the CPU 21 displays a logout screen of the authenticated user on the display unit 26 (step S145).

FIG. 14 is a diagram illustrating the process for caching personal settings of a user performed by the image forming apparatus 20. As illustrated in FIG. 12, the image forming apparatus 20 has obtained, from the server 10, the address book and the determination information 300 indicating that the image forming apparatus 20 can cache the address book. As illustrated in FIG. 14, therefore, the CPU 21 caches the address book in the personal setting caching unit 203 when the user A logs out. When the user A logs out, the server 10 removes the record whose authentication ID is "1" from the authenticated information management unit 103.

By caching and holding cacheable personal settings, the image forming apparatus 20 can improve the user's convenience because the user need not download the personal settings from the server 10 when the user uses the same image forming apparatus 20 again.

The user might change personal settings using the image forming apparatus 20. In this case, when the user logs out of the image forming apparatus 20, a version number of the personal settings changed by the user is incremented. Information regarding the new personal settings and the version number is then transmitted to the server 10 and updating of the personal settings is requested.

An example in which the image forming apparatus 20 obtains determination information 300 indicating that the image forming apparatus 20 can cache personal settings has been described. Next, an example in which the image forming apparatus 20 obtains determination information 300 indicating that the image forming apparatus 20 cannot cache personal settings will be described.

Figure 15:
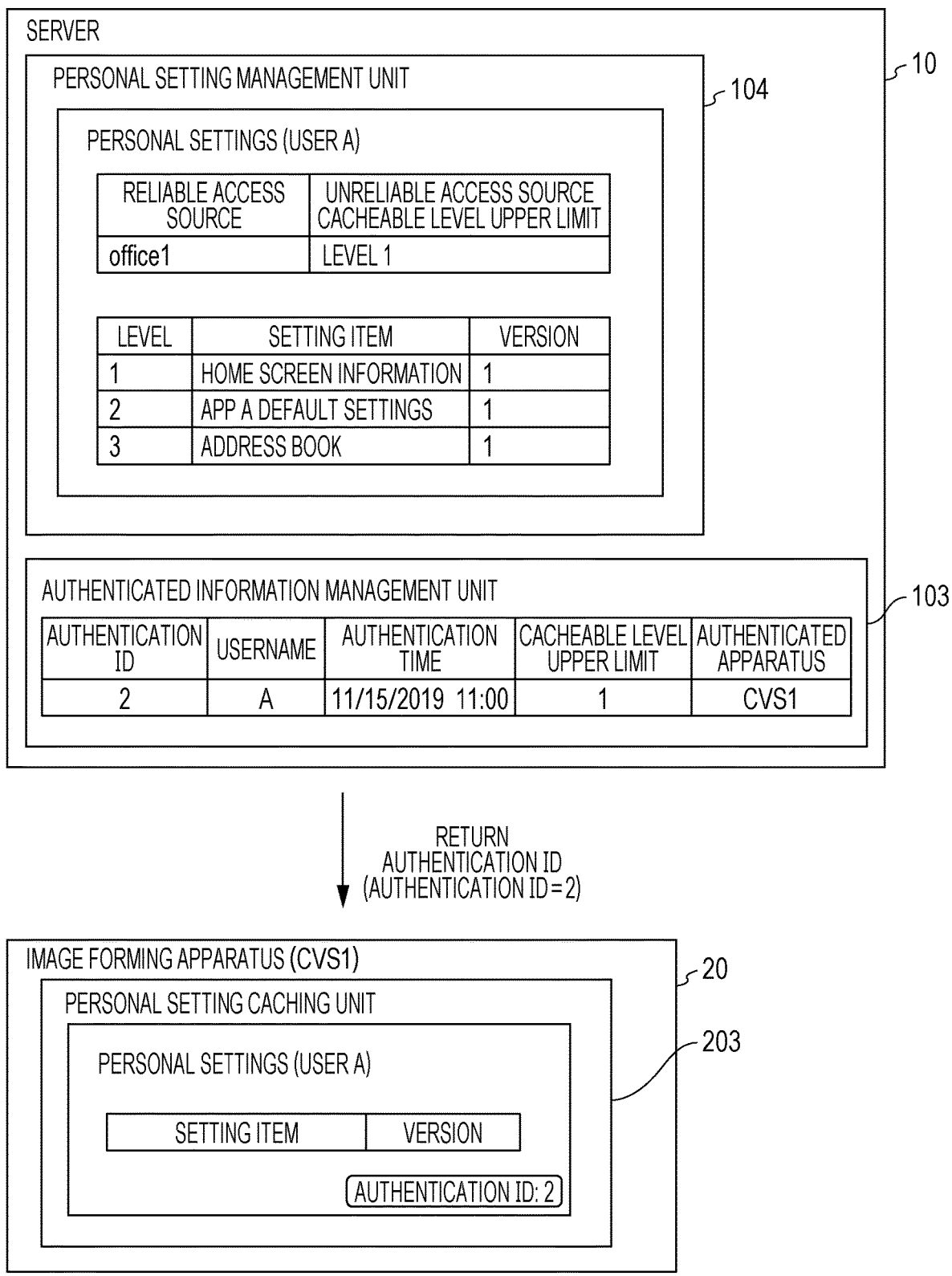
FIG. 15 is another diagram illustrating the process for authenticating a user performed by the server.

FIG. 15 is another diagram illustrating the process for authenticating a user performed by the server 10. FIG. 15 illustrates an example in which the server 10 returns an authentication ID to the image forming apparatus 20. The identifier "office1" of the image forming apparatus 20 is already registered in "reliable access source" in the personal settings of the user A. In this state, an image forming apparatus 20 installed in a convenience store transmits a request to authenticate a user to the server 10. The image forming apparatus 20 installed in the convenience store has an identifier "CVS1".

The identifier "CVS1" of the image forming apparatus 20 is not set in "reliable access source" in the personal settings of the user A. The server 10, therefore, registers an authentication ID, a username, an authentication time, a cacheable level upper limit, and information regarding the image forming apparatus 20 to the authentication list managed by the authenticated information management unit 103. In FIG. 14, "2" is set as the authentication ID. Here, the server 10 sets the cacheable level upper limit at 1. The server 10 then returns the authentication ID "2" to the image forming apparatus 20.

Figure 16:
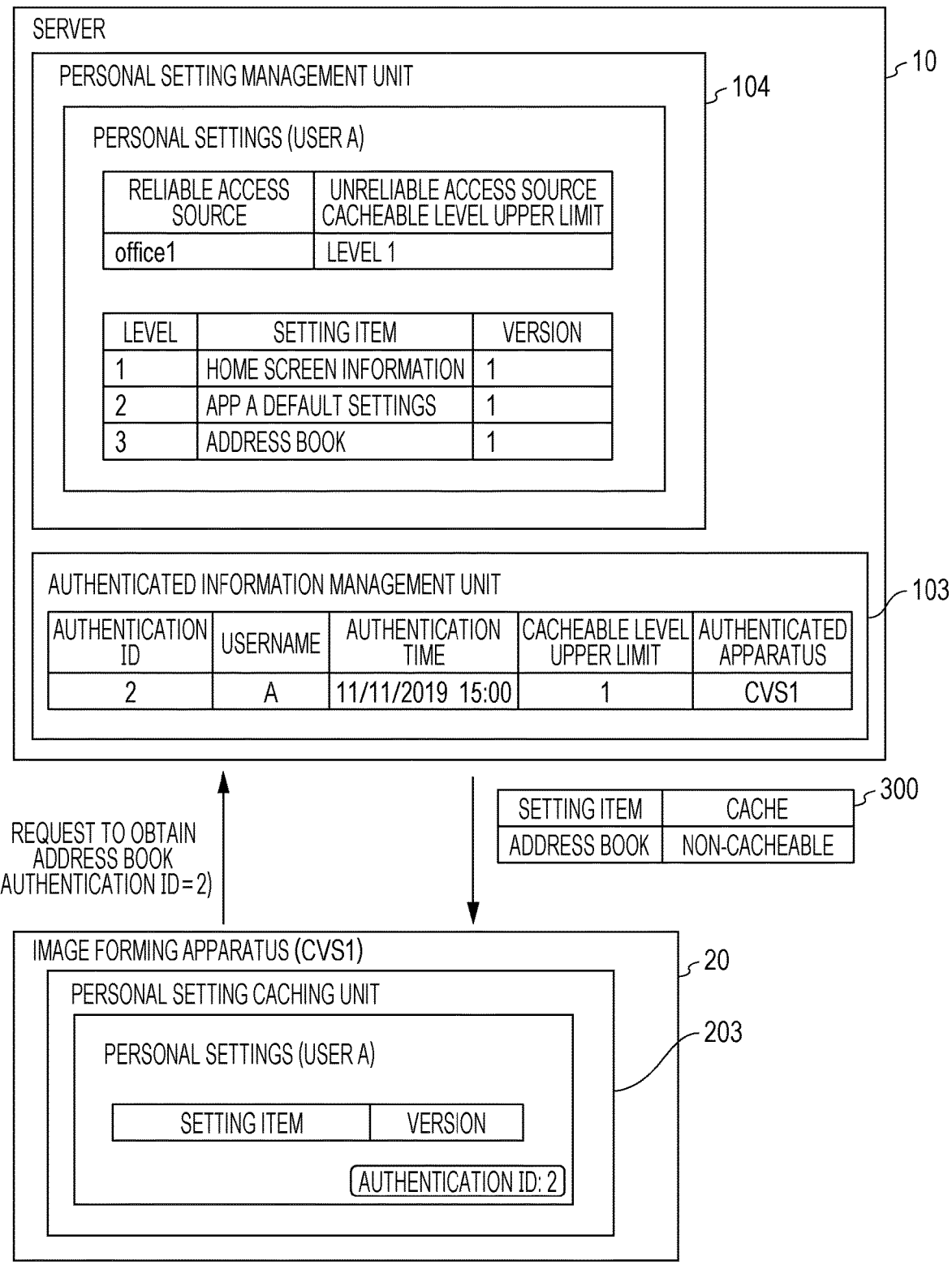
FIG. 16 is another diagram illustrating the process for obtaining personal settings of a user performed by the image forming apparatus and the process for providing personal settings of a user performed by the server.

FIG. 16 is another diagram illustrating the process for obtaining personal settings of a user performed by the image forming apparatus 20 and the process for providing personal settings of a user performed by the server 10.

FIG. 16 illustrates an example of a case where the image forming apparatus 20 whose authentication ID is "2" has requested, from the server 10, the address book in the personal settings of the authenticated user A. In this case, the level of the address book is set at 3 in the personal settings of the user A managed by the personal setting management unit 104. In the authenticated information management unit 103, the cacheable level upper limit of a record whose authentication ID is "2" is 1. The CPU 11, therefore, generates determination information 300 indicating that the image forming apparatus 20 that is the access source cannot cache the address book. The CPU 11 then provides the address book in the personal settings of the user A and the generated determination information 300 for the image forming apparatus 20.

Figure 17:
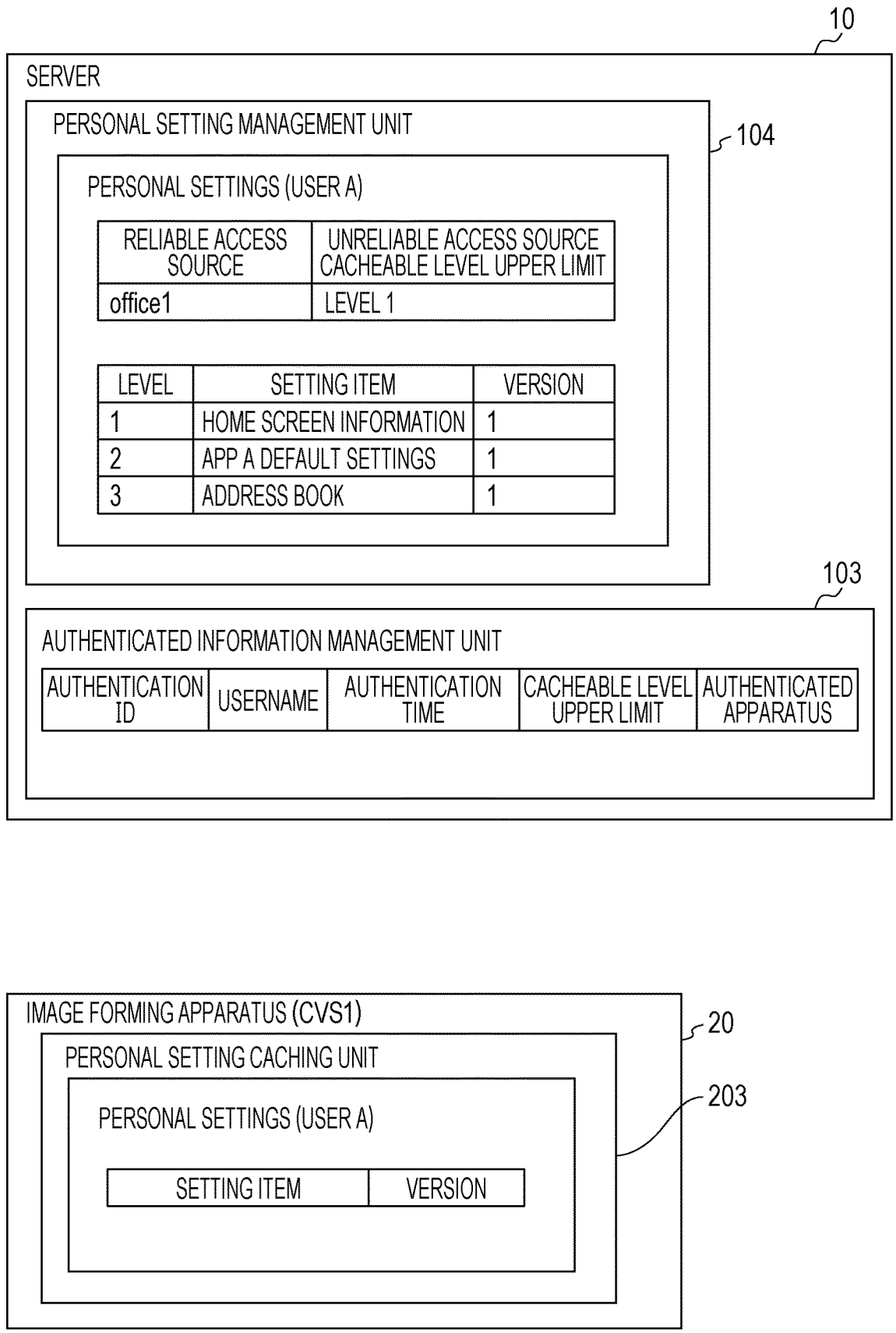
FIG. 17 is another diagram illustrating the process for caching personal settings of a user performed by the image forming apparatus.

FIG. 17 is another diagram illustrating the process for caching personal settings of a user performed by the image forming apparatus 20. In FIG. 16, the image forming apparatus 20 has obtained, from the server 10, the address book and the determination information 300 indicating that the image forming apparatus 20 cannot cache the address book. The CPU 21, therefore, discards the address book without caching the address book in the personal setting caching unit 203 when the user A logs out. When the user A logs out, the server 10 also removes the record whose authentication ID is "2" from the authenticated information management unit 103.

An image forming apparatus 20 that is not a reliable access source because the image forming apparatus 20 is installed in a place where unspecified persons use the image forming apparatus 20, for example, thus discards non-cacheable personal settings without caching the personal settings when a user logs out. By discarding non-cacheable personal settings without caching the personal settings, the image forming apparatus 20 can prevent leakage of the personal settings and improve safety compared to when the personal settings are cached.

The server 10 may count the number of times of authentication for each image forming apparatus 20. When the number of times of authentication has become equal to or larger than a certain threshold, a corresponding image forming apparatus 20 may be determined as a reliable access source or an access source with equivalent reliability. When three levels are set as in the present exemplary embodiment, the server 10 may generate, for the image forming apparatus 20 whose number of times of authentication has become equal to or larger than the certain threshold, determination information indicating that the image forming apparatus 20 can cache personal settings up to level 3 as with a reliable access source. Alternatively, the server 10 may generate, for the image forming apparatus 20 whose number of times of authentication has become equal to or larger than the certain threshold, determination information indicating that the image forming apparatus 20 can cache personal settings up to level 2 unlike a reliable access source.

After the image forming apparatus 20 caches personal settings, a level of the personal settings might be changed. For example, a level of default settings of an application might be changed from 2 to 3. In this case, the server 10 may broadcast information regarding the change in the level of the personal settings, and the image forming apparatus 20 may discard the cached personal settings on the basis of the new level of the personal settings. Alternatively, in this case, the image forming apparatus 20 may discard the cached personal settings on the basis of the new level of the personal settings when the user logs out of the image forming apparatus 20 next time.

Although the server 10 generates determination information 300 and the image forming apparatus 20 caches personal settings on the basis of the determination information 300 in the above exemplary embodiment, the present disclosure is not limited to this example. For example, the image forming apparatus 20 may obtain personal settings from the server 10, and the CPU 21 may generate determination information on the basis of the obtained personal settings. When an image forming apparatus 20 that has obtained personal settings, not the server 10, generates determination information, a burden of the process for generating determination information is eliminated from the server 10.

In addition, although an information processing system in which image forming apparatuses 20 installed at various places download personal settings has been described in the above exemplary embodiment as an example, the present disclosure is not limited to this example. The techniques in the present disclosure can also be applied when information processing apparatuses such as personal computers download personal settings instead of the image forming apparatuses 20.

Each of the processes performed by reading software (program) using a CPU in the above exemplary embodiment may be performed by one of various processors other than a CPU. The processor used in this case may be, for example, a programmable logic device (PLD) whose circuit configuration can be changed after fabrication, such as a field-programmable gate array (FPGA), a dedicated electrical circuit that is a processor having a circuit configuration specifically designed to perform a certain process, such as an application-specific integrated circuit (ASIC), or the like. Each of the processes may be performed using one of various processors or a combination of two or more processors of the same type or different types (e.g., a combination of plural FPGAs, a combination of a CPU and an FPGA, etc.). The hardware configuration of each of the various processors is specifically an electrical circuit obtained by combining together circuit elements such as semiconductor devices.

In addition, although the program for each of the processes is stored (installed) in a ROM or a storage in advance in the above exemplary embodiment, the present disclosure is not limited to this example. The programs may be provided stored in a recording medium such as a compact disc read-only memory (CD-ROM), a digital versatile disc read-only memory (DVD-ROM), or a universal serial bus (USB) memory and provided. Alternatively, the programs may be downloaded from external apparatuses over a network.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application-Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor configured to
obtain personal settings of an authenticated user, the authentication of the user occurring before the obtaining of the personal settings;
determine whether the personal settings of the authenticated user include a reliable access source configured to cache savable ones of the personal settings;
in a case where the personal settings of the authenticated user include the reliable access source, cache the savable ones of the personal settings that are within a first threshold level established by the presence of the reliable access source; and
in a case where the personal settings of the authenticated user do not include the reliable access source, cache the savable ones of the personal settings that are within a second threshold level established by the absence of the reliable access source, the second threshold level being a lower level than the first threshold level,
the savable ones of the personal settings being settings that are personalizable for the user and that include at least one of settings of a home screen displayed on a panel of an apparatus that has requested authentication of the user, settings of applications to be executed on the apparatus, and address book information used to transmit data from the apparatus.

2. The information processing apparatus according to claim 1, wherein the processor provides the personal settings and the determination information to the apparatus.

3. The information processing apparatus according to claim 2, wherein the apparatus is an image forming apparatus.

4. The information processing apparatus according to claim 1, wherein the processor is configured to set, in reliability information as the reliable access source, the apparatus with the information regarding the reliable access source not set in the reliability information.

5. The information processing apparatus according to claim 4, wherein the processor is configured to set the apparatus and an additional apparatus belonging to a certain range from the apparatus in the reliability information as reliable access sources.

6. The information processing apparatus according to claim 5, wherein the apparatus is an image forming apparatus.

7. The information processing apparatus according to claim 4, wherein the processor is configured to, if the apparatus with the information regarding the reliable access source not set in the reliability information is installed in an unreliable place, not set the apparatus in the reliability information as the reliable access source.

8. The information processing apparatus according to claim 7, wherein the processor is configured to, if a number of times of authentication requested by the apparatus becomes equal to or larger than a certain threshold, set the apparatus in the reliability information as the reliable access source.

9. The information processing apparatus according to claim 8, wherein the processor is configured to generate determination information indicating part of the personal settings for the apparatus that has requested the authentication of the user the number of times equal to or larger than the certain threshold.

10. The information processing apparatus according to claim 9, wherein the apparatus is an image forming apparatus.

11. The information processing apparatus according to claim 8, wherein, if the apparatus that has requested the authentication of the user the number of times equal to or larger than the certain threshold is installed in an unreliable place, the processor does not set the apparatus in the reliability information as the reliable access source.

12. The information processing apparatus according to claim 8, wherein the apparatus is an image forming apparatus.

13. The information processing apparatus according to claim 7, wherein the apparatus is an image forming apparatus.

14. The information processing apparatus according to claim 4, wherein the apparatus is an image forming apparatus.

15. The information processing apparatus according to claim 1, wherein the apparatus is an image forming apparatus.

16. A non-transitory computer readable medium storing a program causing a computer to execute a process comprising:
 obtaining personal settings of an authenticated user, the authentication of the user occurring before the obtaining of the personal settings;
 determining whether the personal settings of the authenticated user include a reliable access source configured to cache savable ones of the personal settings;
 in a case where the personal settings of the authenticated user include the reliable access source, caching the savable ones of the personal settings that are within a first threshold level established by the presence of the reliable access source; and
 in a case where the personal settings of the authenticated user do not include the reliable access source, caching the savable ones of the personal settings that are within a second threshold level established by the absence of the reliable access source, the second threshold level being a lower level than the first threshold level, the savable ones of the personal settings being settings that are personalizable for the user and that include at least one of settings of a home screen displayed on a panel of an apparatus that has requested authentication of the user, settings of applications to be executed on the apparatus, and address book information used to transmit data from the apparatus.

* * * * *